(12) United States Patent
Giazotto

(10) Patent No.: US 7,792,614 B2
(45) Date of Patent: Sep. 7, 2010

(54) APPARATUS AND METHOD SUITABLE FOR MEASURING THE GLOBAL DISPLACEMENT OR LOAD ON AN AIRCRAFT COMPONENT

(75) Inventor: Alessandro Riccardo Britannico Giazotto, Bristol (GB)

(73) Assignee: Airbus UK Limited, Bristol (GB)

( * ) Notice: Subject to any disclaimer, the term of this patent is extended or adjusted under 35 U.S.C. 154(b) by 382 days.

(21) Appl. No.: 10/569,773

(22) PCT Filed: Aug. 26, 2004

(86) PCT No.: PCT/GB2004/003661

§ 371 (c)(1),
(2), (4) Date: Feb. 24, 2006

(87) PCT Pub. No.: WO2005/022100

PCT Pub. Date: Mar. 10, 2005

(65) Prior Publication Data

US 2007/0032919 A1 Feb. 8, 2007

(30) Foreign Application Priority Data

Aug. 27, 2003 (GB) .................................. 0320079.7
Dec. 12, 2003 (GB) .................................. 0328872.7
Dec. 22, 2003 (GB) .................................. 0329632.4
Dec. 23, 2003 (EP) .................................. 03258219

(51) Int. Cl.
*G01L 1/24* (2006.01)

(52) U.S. Cl. .................. 701/3; 73/783; 73/862.041; 244/117 R; 700/30; 700/110

(58) Field of Classification Search .................. 701/3; 73/800, 783, 862.041; 244/117 R; 700/30, 700/110; 340/628, 630; *G01L 1/24*
See application file for complete search history.

(56) References Cited

U.S. PATENT DOCUMENTS

| 3,900,828 A | 8/1975 | Lage et al. |
| 4,409,842 A | 10/1983 | Scott et al. |
| 4,426,875 A | 1/1984 | Crosby, Jr. |

(Continued)

FOREIGN PATENT DOCUMENTS

| DE | 40 35 197 A1 | 1/1992 |
| DE | 42 40 600 C1 | 6/1994 |
| DE | 43 16 043 A1 | 11/1994 |

(Continued)

OTHER PUBLICATIONS

Blaha, et al., "Avionic Fiber Optic Sensor Systems," *Proc. 1$^{st}$ int. workshop on photonic networks, components and applications*, (pp. 142-150) (1990).

*Primary Examiner*—Tuan C To
(74) *Attorney, Agent, or Firm*—Patterson Thuente Christensen Pedersen, P.A.

(57) ABSTRACT

The load on an aircraft component is measured. In one embodiment, the system is a contactless, all-weather displacement measuring system including a processing unit and a plurality of pairs of controllable microwave emitters and microwave detectors. When the aircraft component is subjected to a load, relative movement of the emitter and detector is caused. The detector generates signals which convey information concerning the relative positions of the emitter and the detector of the pair, the signals being received and processed by a signal processor of the processing unit. The processing unit may, for example with the use of triangulation techniques, provide an output signal representative of the load sustained by the aircraft component. The system may be used to control braking in dependence on the output signal so as to maximise braking efficiency without overloading the landing gear leg.

16 Claims, 5 Drawing Sheets

U.S. PATENT DOCUMENTS

| | | | |
|---|---|---|---|
| 4,684,929 A | 8/1987 | Edwards et al. | |
| 4,900,920 A | 2/1990 | Federmann et al. | |
| 4,962,669 A | 10/1990 | Gernhart et al. | |
| 5,044,205 A | 9/1991 | Wolff et al. | |
| 5,094,527 A * | 3/1992 | Martin | 356/32 |
| 5,167,385 A | 12/1992 | Häfner | |
| 5,381,005 A | 1/1995 | Chazelas et al. | |
| 5,397,891 A | 3/1995 | Udd et al. | |
| 5,479,828 A * | 1/1996 | Bonniau et al. | 73/800 |
| 5,606,137 A | 2/1997 | Penketh | |
| 5,646,401 A | 7/1997 | Udd | |
| 5,656,783 A | 8/1997 | Frisch et al. | |
| 6,566,648 B1 | 5/2003 | Froggatt | |
| 6,637,266 B1 * | 10/2003 | Froom | 73/583 |
| 6,817,246 B1 | 11/2004 | Rottner et al. | |
| 6,817,574 B2 * | 11/2004 | Solanille et al. | 244/117 R |
| 2002/0060632 A1 * | 5/2002 | Kadwell et al. | 340/628 |
| 2002/0125414 A1 * | 9/2002 | Dammann | 250/227.14 |
| 2004/0100588 A1 * | 5/2004 | Hartson et al. | 348/608 |
| 2005/0240321 A1 * | 10/2005 | Darke | 701/3 |

FOREIGN PATENT DOCUMENTS

| | | |
|---|---|---|
| DE | 43 16 044 A1 | 11/1994 |
| EP | 0 066 923 A2 | 12/1982 |
| FR | 2 520 870 | 8/1983 |
| FR | 2 578 974 | 9/1986 |
| FR | 2 828 278 | 2/2003 |
| WO | WO 81/03698 | 12/1981 |
| WO | WO 01/18487 A1 | 3/2001 |

* cited by examiner

APPARATUS AND METHOD SUITABLE FOR MEASURING THE GLOBAL DISPLACEMENT OR LOAD ON AN AIRCRAFT COMPONENT

BACKGROUND OF THE INVENTION

The present invention relates to an apparatus and a method suitable for measuring the load sustained by an aircraft component. In particular, the present invention relates to an apparatus for determining the load sustained by an aircraft component when braking and/or manoeuvring the aircraft on the ground.

When an aircraft manoeuvres on the ground (including, for example, immediately after touch down), the aircraft is subjected to various loads including vertical wheel to ground loads and horizontal drag loads including, for example, loads caused by friction between the tyres of the wheels of the aircraft and the ground. The landing gear is subjected to significant horizontal loads on braking. The landing gear and other components of the aircraft have to be carefully designed in order for the aircraft to be able to withstand such loads, and other operational loads, but without unduly increasing the mass of the aircraft.

By using a load measuring device as part of a feedback braking system it is possible to limit, at least in part, the maximum load sustained by the airframe, landing gear, or a part thereof and/or to facilitate efficient braking of the wheels. In addition, such a load measuring device may be used to monitor and/or improve the fatigue life of an aircraft component. It may also be advantageous to use load measuring devices during the testing and development of new aircraft, for example, during a validation process. A load measuring device may also be used during normal mode analysis (NMA), for example during ground vibration tests or airborne tests.

It is known to use strain gauges as part of such load measuring devices. These, however, have disadvantages associated with them. For example, strain gauges may have to be bonded to the structure being monitored, may require specialist maintenance, may only be able to provide a local load measurement, may be easily damaged, may be susceptible to noise and/or may require temperature compensation. It is also known to use accelerometers, alongside strain gauges, in NMA. These have disadvantages associated with them, for example they may not be suitable for use on an aircraft in flight and may be costly to fit, and later remove, specifically for a ground vibration test.

SUMMARY OF THE INVENTION

It is an object of the present invention to provide a load measuring apparatus suitable for external use on an aircraft and which mitigates one or more of the disadvantages outlined above. Alternatively, or additionally, it is an object of the present invention to provide an improved apparatus capable of providing information from which an indication of the load distribution in an aircraft component can be ascertained.

The present invention provides an aircraft including an apparatus for measuring a load on an aircraft component, the apparatus including a processing unit and a plurality of pairs of electromagnetic radiation devices, wherein each pair of devices comprises an emitter and a detector, the emitter being an emitter of electromagnetic radiation, and the detector being able to detect radiation from the emitter, the apparatus is arranged so that, when the aircraft component is subjected to a load of the type to be measured, the separation of the emitter and the detector of at least one pair of devices is altered, the pairs of devices in use sending signals from which an indication of the deformation of the aircraft component may be ascertained, and the processing unit is arranged to receive signals from which an indication of the deformation of the aircraft component may be ascertained and to provide an output signal which provides an indication of the load sustained by the aircraft component, the output signal being ascertained by the processing unit by means of a calculation involving the signals received by the processing unit and load model data.

An embodiment of the present invention thus provides an improved device for measuring loads on an aircraft component. The use of electromagnetic radiation devices has several potential advantages over the use of strain gauges. The device used in an embodiment of the present invention may be faster to react to changes in loading, may be more accurate than the strain gauges of the prior art, and/or may give an image of the global deformation/stress of a structure. The loads/displacements measured by an embodiment of the present invention also need not be local loads/displacements such as those measured by strain gauges or the like, of the prior art.

An embodiment of the present invention also enables the loading of an aircraft component to be monitored. This in turn enables the aircraft component to be redesigned and made lighter in specific regions, for example those regions in which the apparatus measures relatively small loads, and lighter overall. The apparatus may also facilitate improved monitoring of the fatigue life of the component, by means of faster reaction times that for example enable the monitoring of high frequency loading changes. An embodiment of the present invention may be used as part of a feedback system to limit the maximum load sustained by the aircraft component. This may allow the aircraft component to be made lighter and/or allow the fatigue life of the component to be extended. An embodiment of the present invention further enables loads to be monitored during braking and may facilitate better control of braking, which may in turn facilitate more efficient braking.

It shall be understood that the plurality of pairs of electromagnetic devices need not necessarily contain equal numbers of emitters and detectors. The same emitter may be present in more than one pair of devices. Alternatively or additionally, the same detector may be present in more than one pair of devices. By way of example, 3 pairs of devices may include, amongst other combinations, 3 emitters and 3 detectors, or 1 emitter and 3 detectors, or 3 emitters and 1 detector.

The apparatus may include a multiplicity of pairs of devices. For example, the apparatus may contain more than 4 and preferably at least 10 detectors. Alternatively or additionally the apparatus may contain more than 4 and preferably at least 10 emitters. The apparatus may contain, for example at least 10 pairs of devices. By increasing the number of pairs of devices, it may be possible to increase the resolution of an indication of the deformation of the aircraft component. The number of pairs of devices may be such that there is a redundancy, or multiple redundancies, in the number of pairs of devices that are required to measure a load and/or deformation. Conveniently, there is a redundancy, or multiple redundancies, in the number of signals from which an indication of the deformation may be ascertained. Such redundancy in information may improve reliability and/or accuracy.

The loads sustained by the aircraft component can cause the component to elastically deform (such deformations including bending, twisting and/or other movement) with respect to the rest of the aircraft. Thus, by measuring such movements it is possible to ascertain an indication of the load sustained by the aircraft component.

By increasing the number of pairs of devices, it may be possible to increase the resolution of an indication of the deformation of the aircraft component.

The load model data may comprise data dependent on the relationship between the deformation of the component and the physical properties of the component. For example the data may concern the relationship between the separation between the emitter and detector of each pair and the load sustained by the component. The data is preferably stored in electronic memory in, or immediately accessible by, the processing unit. The data may be calculated, conveniently in advance, by means of mathematically modelling the loading of the component, for example making use of finite element analysis techniques. The data may be ascertained in advance by making calibration measurements in relation to the aircraft component (or a component substantially identical thereto). Both such mathematical modelling techniques and calibration measurements may be used in combination. For example, a multiplicity of calibration measurements may be made of the deformation of the aircraft component in response to successive different known loads. The data may represent a model of the physical properties of at least a part of the aircraft component, once notionally broken down into finite elements, so that the processing unit can, during use, convert emitter-detector separations into the output signal by means of a calculation involving finite-element analysis. The processing unit may perform interpolation calculations when calculating the output with the use of the data.

One advantageous and preferable feature of the apparatus of the present invention is that there need be no direct electrical contact between the emitters and detectors. Another preferable feature is that there need not be any separate mechanical linkage between the emitters and detectors (other than for example the structure on which the emitters and detectors are positioned). Also there need not be any wave guide means, for example fibre optic cables or the like, between at least one, and more preferably all, of the emitters and at least one, and more preferably all, the detectors. Preferably, the apparatus is so arranged that, in use, the radiation from at least one, and more preferably all, of the emitters detected by at least one, and more preferably all, of the detectors travels through a gaseous medium, for example the air that is naturally present, at least for the majority of the distance between the emitters and the detectors, and preferably for the entire distance.

Preferably at least one electromagnetic radiation device in a pair of devices is fixed at a first position local to the aircraft component, and preferably at least one electromagnetic radiation device in a pair of devices is fixed at a second position remote from the first position and more preferably remote from the aircraft component.

The emitter and detector of at least one pair of devices may be configured to be able to be mounted at any of a multiplicity of different distances apart.

Preferably a multiplicity of electromagnetic devices of one type are fixed at respective spaced apart positions local to the aircraft component and at least one electromagnetic device of the other type is fixed at a position remote from the aircraft component.

The apparatus may be so arranged that the separation of an emitter and a detector is ascertained by measuring the elapsed time between an emitter emitting a pulse of electromagnetic radiation and the pulse of electromagnetic radiation being received by a detector. The pulse of electromagnetic radiation may be a time-coded pulse of electromagnetic radiation. For example, each emitter may regularly emit an individual pulsing time-code signal (PTCS). In this case, an indication of the separation of an emitter and a detector may be ascertained by computing the elapsed time between the emission of a PTCS from an emitter and the receiving of the PTCS by a detector. Using the elapsed time and knowledge of the speed of light in air, the separation may then be calculated. The emitters are preferably synchronised to emit pulses simultaneously. The PTCS is preferably represented by a modulated signal on a carrier signal. The PTCS may be an analogue or digital signal. It shall be understood that measuring the elapsed time between an emitter emitting a pulse of electromagnetic radiation and the pulse of electromagnetic radiation being received by a detector need not necessarily relate to measuring an absolute value of time, for example the elapsed time may be measured by means of assessing a phase change, for example using interferometry.

If the distance between sufficient numbers of points can be measured, the change in position of any point can be ascertained. This may be achieved by using known triangulation techniques. The apparatus is preferably so arranged that the pairs of devices in use send signals from which an indication of the deformation of the aircraft structure may be ascertained using triangulation. Calculations which ascertain the indication of the deformation of the aircraft component may be carried out in the processing unit. Preferably those calculations involve the use of triangulation techniques.

A boundary condition may be used in the calculation performed to ascertain the output signal indicative of the load. If, in addition to knowing the distance, or change in distance, between a number of points, a boundary condition or plurality of boundary conditions are known, then the relative position of at least part of the aircraft component may be ascertained. Calculations which ascertain the indication of the relative position of a part (or parts) of the aircraft component may be carried out in the processing unit. Preferably those calculations involve the use of triangulation techniques and the incorporation of a boundary condition.

The boundary condition may require that, for the purpose of the calculation, a certain point on the aircraft component is assumed to remain in a fixed position relative to the aircraft main structure. The boundary condition may require that two points on the aircraft component are assumed to remain fixed relative to each other. The boundary condition may be ascertained by calculating a best-fit surface or line on which it must then be assumed a plurality of points must lie. The best-fit surface or line may for example be representative of a surface of a part of an aircraft component or a line on that surface, and the plurality of points may for example represent the location of the electro magnetic devices. The boundary condition may be the location of an emitter or a detector relative to ground level. The boundary condition may be any other data that would allow an indication of the position of at least part of the aircraft component to be ascertained.

The apparatus is preferably so arranged that the pairs of devices in use send signals from which an indication of the shape of at least part of the aircraft component may be ascertained.

By way of example an indication of separation between each emitter and each detector may be provided by each pulse of electromagnetic radiation emitted by the emitters. Furthermore, using triangulation techniques and with knowledge of the boundary conditions imposed by a discretised model of the component, for example a finite element model, the position and/or shape of at least part of the component may be calculated. Over time, regular 'snapshots' of the shape of the component may be provided, preferably in real time.

The detectors may be mounted in the region of a structure or material that is able to absorb a significant proportion of electromagnetic radiation of a frequency in the range of frequencies detectable by a detector. Such a structure or material reduce the effects of reflected or diffracted electromagnetic radiation originating from an emitter interfering with the operation of the apparatus.

The apparatus may be capable of distinguishing between electromagnetic radiation received directly from an emitter and electromagnetic radiation reflected from, for example, the aircraft structure. The apparatus may be capable of distinguishing between electromagnetic radiation received directly from an emitter and electromagnetic radiation reflected from a reflective element on the aircraft component. Standard mathematical methods facilitating echo removal may be used for example. Preferably, the apparatus is arranged and configured so that the or each detector is adapted to detect radiation emitted directly from the or each emitter with which the detector is paired. For example the apparatus is preferably arranged such that the detected radiation is received from the emitter without reflection, or refraction and is preferably transmitted along a notional straight line on which the detector and the emitter lie. It will be understood however that it is within the scope of the present invention for the detected radiation received from the emitter to have travelled on a path that diverges from the notional straight line on which the detector and the emitter lie. In the event that a detector of the apparatus of the invention is arranged to receive reflected radiation from an emitter, the detector and emitter could be placed adjacent to each other. In such a case it will be understood that when the aircraft component is subjected to a load of the type to be measured, the separation of the emitter and the detector will be altered only by means of the path length of radiation from the emitter to the detector, via a reflecting surface, being altered and, as such, the phrase "separation of the emitter and the detector" should be construed accordingly.

The apparatus may be able to measure loads in more than one direction.

One advantageous feature of the apparatus of the present invention is that it may able to provide an indication of the local load or stress at a location and preferably of a plurality of locations on the aircraft component. One or more of said location or locations may be separated from the apparatus. Thus it is possible to provide an indication of the load and/or stress at a location on the component, despite no part of the apparatus being positioned at said location. The output signal provided by the processing unit of an embodiment of the present invention may be representative of the load distribution within a part of the aircraft component. The output signal provided by the processing unit of an embodiment of the present invention may include indications concerning a stress distribution within a part of the aircraft component. Preferably the apparatus allows stresses or loadings to be predicted at a position separated from any part of the apparatus, the part being a detector or an emitter for example.

The apparatus may include a control unit for controlling the radiation emitted by an emitter. The processing unit may perform the function of the control unit and may therefore effectively include, or form part of, the control unit. Alternatively the processing unit need not perform any control function. The processing unit may include, or be in the form of, a signal processor and/or a micro-processor. The processing unit may comprise physically separate sub-units.

The or each emitter of the plurality of pairs of devices is preferably arranged to emit radiation in the microwave band. An emitter is preferably arranged to emit electromagnetic radiation, conveniently as a carrier signal, having a wavelength in the range of 1 mm to 300 mm (a frequency range of 1 to 300 GHz). The use of microwave radiation in the detector system of an embodiment of the present invention is advantageous for several reasons. Microwave radiation is not significantly affected by environmental conditions like humidity and visibility (including refraction and reflection caused by moisture in the air), and therefore has significant advantages over the use of electromagnetic radiation at wavelengths in the visible light spectrum. The wavelength profile of the radiation emitted by an emitter is preferably chosen in consideration of the resolution required, the reliability of the pairs of electromagnetic radiation device at the chosen wavelength, and/or the expected air/weather conditions. The dependence of resolution of the apparatus on wavelength may be such that an increase in the wavelength reduces the resolution attainable. A decrease in wavelength may increase the likelihood of water or other moisture in the air detrimentally affecting the transmission of radiation.

The or each emitter of the plurality of pairs of devices of the apparatus is preferably an omni-directional emitter. It shall be understood that 'omni-directional' in relation to an emitter, means the emitter is able to emit a signal in substantially all directions over a solid angle of grater than 3 steradians and more preferably greater than 5 steradians. An emitter may be able to emit signals at a multiplicity of angles at least two of which being more than 30°, and preferably more than 60°, apart.

A detector of the apparatus may have a relatively lamellar profile. Preferably a detector is suitable for use on an aircraft, for example the detector may be streamlined or the detector may present a low profile. A detector of the apparatus is preferably a microwave antenna receiver. The antenna may be in the form of a microstrip antenna. A microstrip antenna is advantageous for its low profile. In addition they may be easily fabricated and may be readily adapted to conform to most surface profiles.

The detector may be in the form of an omni-directional detector. The antenna may comprise a plurality of distinct elements that together form an array. The antenna may be in the form of a panel antenna. The antenna may be in the form of any other type of antenna, which converts electromagnetic radiation, for example in the microwave or radiowave spectra, into a current (for example an a.c. signal).

The present invention may have application in relation to assessing the load on any aircraft component, where loading of the component causes movement of the component. The invention is of particular benefit in the case where the aircraft component is at least part of a leg of an aircraft landing gear. Preferably, in such a case, at least one electromagnetic device in a pair of devices is fixed to the top part of the landing gear leg or to the airframe, whilst at least one electromagnetic device in a pair of devices is fixed at a lower part of the leg (which moves by a greater amount, when the leg is loaded, than a higher part of the leg), for example the outer cylinder of a shock absorbing part of the leg. The pairs of devices are preferably arranged to measure the movement made by the aircraft leg under loading.

The aircraft component could be at least a part of a wing of an aircraft. For example, the load sustained by a portion of a wing could be assessed by measuring the movement of the tip of the wing.

The aircraft component could be in the form of a control surface, such as an aileron. The aircraft component could be in the form of a part of the fuselage. The aircraft component could be in the form of a horizontal and/or vertical lifting surface.

The aircraft may further include a deformation control system, wherein the deformation control system is arranged to monitor a measurement of the deformation of the aircraft component, the measurement being ascertained from the signals received by the processing unit, and to control a part of the aircraft in dependence on the measurements so monitored. For example, the deformation control system may be arranged to monitor the surface geometry of a wing of the aircraft and may be arranged to control a device, such as an actuator, the device being so arranged to modify the geometry of the wing surface. The geometry of the wing surface may, for example, be altered as to generate more camber on the wing cross section, in dependence on deformations of the wing surface so monitored.

The deformation control system could effect a deformation of the wing structure in dependence on the measurement of a large cyclic deformation, such as deformations caused by flutter. The deformation of the wing structure that is effected may be such that the flutter is damped.

The deformation control system may be arranged to control a part of the aircraft in dependence on the measurements of the loads sustained by the aircraft component. The deformation control system may monitor the relative position of one or more moving parts of the aircraft. For example, detectors could be arranged to allow the movement of landing gear during extension retraction to be monitored and preferably controlled by means of an appropriate control system. Thus an embodiment of the present invention may facilitate the replacement of conventional proximity sensors (usually only provided with the ability to send a binary—on/off—indication of a position) with a more reliable and informative position detection system. The measurement may be ascertained from the output signal from the processing unit.

The aircraft may further include a load control system, wherein the load control system is arranged to monitor a measurement of the loads sustained by the aircraft component, the measurement being ascertained from the output signal from the processing unit, and to control a part of the aircraft in dependence on the measurements so monitored.

For example, the load control system may be arranged to control a part of the aircraft so as to reduce the loads sustained by the aircraft in the event that the load control system calculates that the load exceeds given criteria. The given criteria could simply be a preset threshold. The given criteria could alternatively or additionally be time dependent. The given criteria may be a threshold that varies in dependence on other parameters.

The load control system may be in the form of a braking control system. The aircraft component may in that case be a leg of an aircraft landing gear. The braking control system may be arranged to control the braking in dependence on the loads monitored by the braking control system. The braking control system may for example be arranged to be able to control the braking force applied to the wheels of the landing gear. The braking control system may be arranged so that in the event that the braking control system detects that the load sustained by the leg exceeds a given threshold value, the level of braking is reduced. The braking control system is advantageously arranged so that the output signal generated by the processing unit is received by the braking control system. The braking control system may be arranged to monitor the load sustained by the aircraft leg and to control the braking force applied in order that under normal operating conditions the load on the leg of the landing gear does not exceed a preset threshold. The preset threshold may for example correspond to the maximum load that the aircraft leg is designed to withstand during normal operation.

The load control system and the processing unit of the apparatus for measuring the load are preferably in the form of physically separate systems. However, it would be possible for the load control system and the processing unit to be part of a single control system. For example, a computer processor could perform the functions of both the load control system and the processing unit of the load measuring apparatus. The load control system may form part of the aircraft's flight control system. The deformation control system may form part of the aircraft's flight control system. The brake control system may form part of the aircraft's flight control system.

The present invention also provides an apparatus for measuring a load on an aircraft component, the apparatus including a plurality of pairs of electromagnetic devices, wherein each pair of devices comprises an emitter and a detector, the emitter being an emitter of electromagnetic radiation, and the detector being able to detect radiation from the emitter, the apparatus being arranged to be suitable for use on an aircraft so that, when the aircraft component is subjected to a load of the type to be measured, the separation of the emitter and the detector of at least one pair of devices is altered, the pairs of devices in use generating signals from which an indication of the deformation of the aircraft component may be ascertained. The apparatus may be provided separately from an aircraft. For example, the apparatus may be provided as a kit for converting an aircraft into an aircraft as according to the invention as described herein. The apparatus may further include a processing unit. Preferably the processing unit is arranged to receive signals from which an indication of the deformation of the aircraft component may be ascertained and to provide an output signal which provides an indication of the load sustained by the aircraft component, the output signal having been ascertained by the processing unit by means of a calculation involving the signals received by the processing unit and load model data.

The present invention also provides a method of measuring a load on an aircraft component, the method including the following steps: (i) causing electromagnetic radiation to be emitted from an emitter, (ii) collecting data dependent on the change in separation between the emitter and a detector, the change in separation being caused by a load sustained by the aircraft component, (iii) repeating steps (i) and (ii) in respect of a different emitter and/or detector, and (iv) providing an indication of the load sustained by the aircraft component from the data collected in step (ii) and from load model data.

The method may include a separate step of calculating the displacement of the aircraft component. Such calculation may involve the use of triangulation. Preferably the method includes performing a calculation in which an indication of the deformation of the aircraft component is ascertained by triangulation. This calculation may, for example be included in step (iv) of the above-described method.

The indication of the separation between the emitter and the detector and the indication of the load may each be in the form of a numerical value. The numerical value(s) may be represented by digital or analogue electronic signals. The load model data used in the method may be calculated and/or determined by calibration measurements in advance and for example stored in a memory unit.

The apparatus of the invention may be used in the method of the invention. Thus, features described with reference to the apparatus of the invention may be incorporated into the method of the invention. Also, features described with reference to the method of the invention may be incorporated into the apparatus of the invention.

The present invention also provides a method of controlling the loads sustained by an aircraft component. The method according to this aspect of the invention may include monitoring the loads sustained by the aircraft component by using the apparatus for measuring loads in accordance with any of the aspects of the present invention or by performing the method of measuring a load in accordance with any of the aspects of the present invention. The method according to this aspect of the invention may include a step of controlling a part of the aircraft in dependence on the results of the monitoring of the loads. The method according to this aspect of the invention may be performed when braking and/or manoeuvring the aircraft on the ground. The method may for example be performed when manoeuvring and braking the aircraft on the ground immediately after touch down when landing the aircraft. The aircraft may be braked by means of the application of one or more wheel brakes. Accordingly, the present invention also further provides a method of manoeuvring an aircraft on the ground, the method including a step of controlling the aircraft according to the above-described method, wherein the loads on the leg of a landing gear of the aircraft are monitored and the steering and/or braking of the aircraft is controlled in dependence on the loads monitored.

According to another aspect of the invention there is provided an apparatus for measuring a load on an aircraft component, the apparatus including a processing unit, a controllable emitter of electromagnetic radiation, and a detector able to detect radiation from said emitter, wherein the apparatus is arranged so that, when the aircraft component is subjected to a load of the type to be measured, relative movement of the emitter and detector is caused, the detector in use generates in response to electromagnetic radiation received from the emitter a signal that is received by the processing unit, a characteristic of the signal being dependent on the relative positions of the emitter and detector, and the processing unit is arranged to provide an output signal dependent on the load sustained by the aircraft component. The characteristic of the signal may for example be representative of a time, for example the time at which the signal is sent by the detector.

The present invention may have application in relation to the measuring of loads on components, objects, or the like other than aircraft components. For example, loads on buildings or other structures such as bridges could be measured by means of the present invention. Thus the invention more generally provides an apparatus for measuring loads and a method of measuring loads as set out above except that the object of the measurements need not necessarily be in the form of an aircraft component. Also, the present invention may have a wider application in relation to the measuring of relative movement of a structure, for example the movement of two points (or two locations) on the structure, without necessarily measuring the load that causes such movement. For example, the aerodynamic shape of the wing of an aircraft, or part thereof, could be measured and/or monitored by means of an embodiment of the present invention. The aspect of the present invention relating to the measurement of the relative positions of two locations (and not necessarily calculating an indication of a load therefrom) may of course have application in relation to any component, object, or the like (i.e. not necessarily on an aircraft). For example, there may be provided in accordance with a more general aspect of the present invention an apparatus for measuring the movement of a part of a structure, the apparatus including a processing unit and a plurality of pairs of electromagnetic radiation devices, wherein each pair of devices comprises an emitter and a detector, the emitter being an emitter of electromagnetic radiation, and the detector being able to detect radiation from the emitter, at least one of the devices is positioned at a first location on the structure, the pairs of devices are arranged to send, in use, to the processing unit signals from which an indication of the time taken for the electromagnetic radiation to travel from the emitter to the detector of each pair may be ascertained, and the processing unit is arranged to process, in use, the received signals to ascertain the relative movement of a part of the structure relative to another part of the structure. The processing of the signals may for example include calculating the separation, or change in separation, of the emitter and detector of each pair of devices (for example, from a knowledge of the speed of light in air and the time taken for the electromagnetic radiation to travel between the emitter and the detector). The processing unit may be arranged to ascertain the relative movement of the device at the first location relative to another part of the structure. All of the devices of the apparatus are preferably positioned at various locations on the structure. The processing of the received signals to ascertain the relative movement may involve the use of triangulation techniques. The processing of the received signals to ascertain the relative movement may involve the use of a finite element model of the structure and the processing may therefore involve finite element analysis techniques. The processing unit may be arranged to assess an indication of the deformation of at least a part of the structure. The processing unit may be arranged to assess an indication of a load sustained by at least a part of the structure. The indication of the load may be ascertained by the processing unit by means of a calculation involving load model data. The apparatus may but need not necessarily be arranged to measure the relative movement between two locations on an aircraft. The structure may for example be in the form of an aircraft component. The apparatus could for example be used to measure and/or monitor the change in shape of any object. The apparatus could alternatively or additionally be used as a proximity sensor. For example, the apparatus may be used to monitor the position of a moving part of the aircraft landing gear relative to the aircraft or a part thereof, and may be able to provide an indication of the position of the landing gear at a number of 'snap-shots' in time. Such a proximity sensor may be able to mitigate some of the disadvantages with the proximity sensors of the prior art that provide only a binary (on-off) signal regarding the position of an aircraft component. Such prior art sensors are thus only able to provide an indication that the aircraft landing gear is in one of only two states, namely fully deployed or not fully deployed and is unable to provide any usefully information regarding the position of the landing gear between its stowed and fully deployed positions. The apparatus of the present invention could be used as a proximity sensor indicating the relative extension of the landing gear leg, as the shock absorbing part of the landing gear moves on landing.

This more general aspect of the present invention may also have application in an apparatus or method for use in normal mode analysis (NMA). For example the apparatus may be used to measure deformation and/or loadings during a ground vibration test. The apparatus may be so arranged that the NMA may be performed during flight of the aircraft. The apparatus may be so arranged that the NMA may be performed during a ground vibration test. The apparatus may be so arranged that the NMA may be performed during ground manoeuvres.

Other features of the present invention as described herein may be incorporated, where appropriate, into this more general aspect of the invention. For example, the radiation is preferably in the form of microwave radiation. Also, the apparatus may include a deformation control system to facilitate monitoring and control of the deformation (or change in position or shape) of the structure or a part thereof.

Other features of the present invention as described herein may be incorporated, where appropriate, into this more general aspect of the invention.

DESCRIPTION OF THE DRAWINGS

Embodiments of the present invention will now be described by way of example with reference to the accompanying schematic drawings of which.

DETAILED DESCRIPTION

Figure 1:
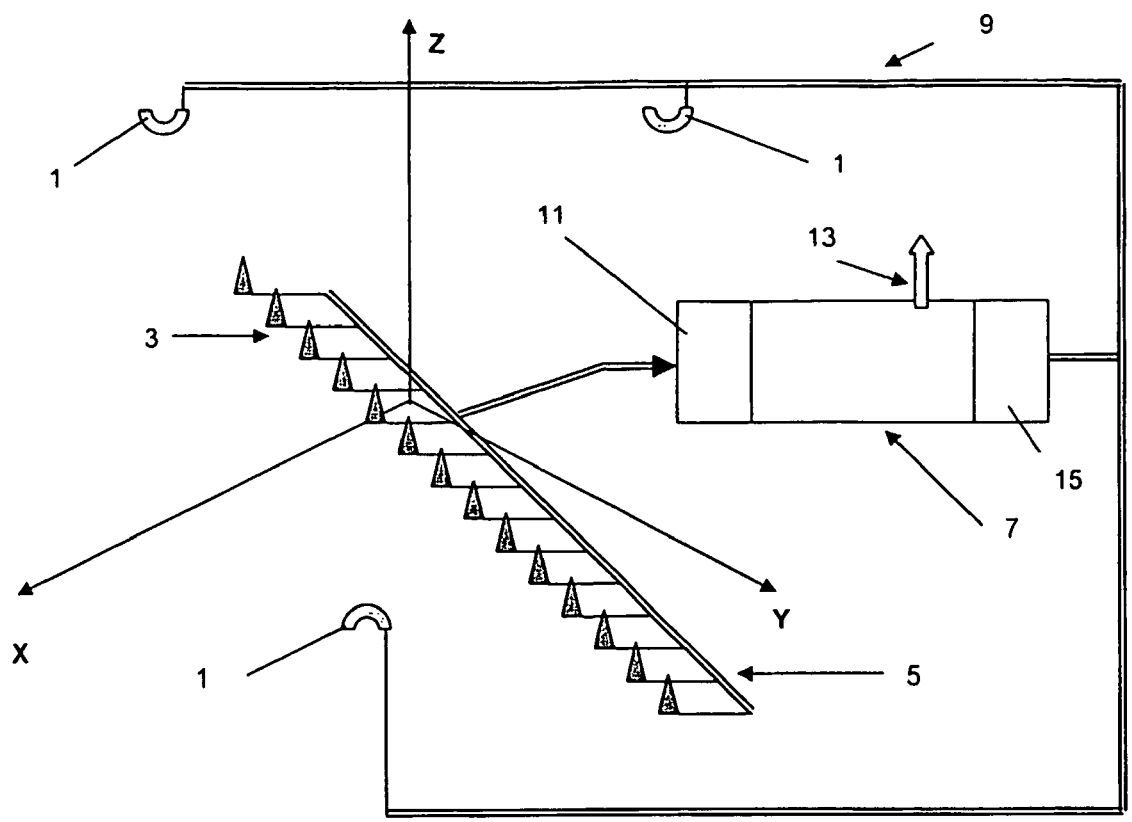
FIG. 1 shows an apparatus for measuring load in accordance with a first embodiment of the invention.

FIG. 1 shows a schematic of an apparatus for measuring the load on an aircraft according to a first embodiment of the invention. The apparatus includes three omni-directional emitters 1 of microwave radiation and fourteen generic microwave detectors 3. Each of the emitters 1 is paired with each of the detectors 3 and, as such, the apparatus effectively includes forty-two pairs of microwave devices. The microwave devices are arranged in various locations in 3-dimensions, which is illustrated schematically by inclusion of the X-Y-Z axes in the figure. The detectors are in the form of microwave antenna receivers. Each antenna receiver is in the form of an omni-directional antenna. Each of the detectors 3 is shielded with material (not shown) that absorbs microwave radiation to reduce the amount of spurious, for example reflected, microwave radiation being received. Apertures, in the form of windows (not shown), are provided which allow the microwave radiation emitted directly from each respective emitter 1, to be received.

The detectors 3 are all connected to a first data bus 5, which in turn is connected to a processing unit 7. The emitters 1 are also connected via another, second, data bus 9.

Figure 2A:
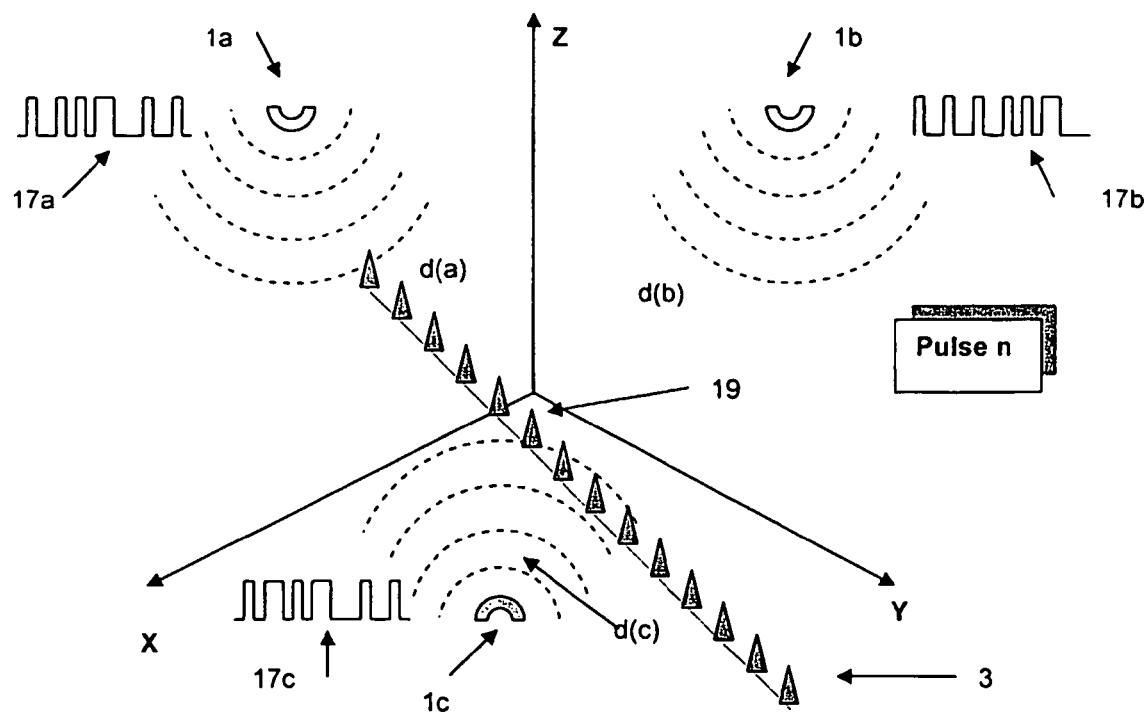
FIGS. 2a and 2b show a plurality of pairs of electromagnetic devices during use of the first embodiment of the invention.
Figure 2B:
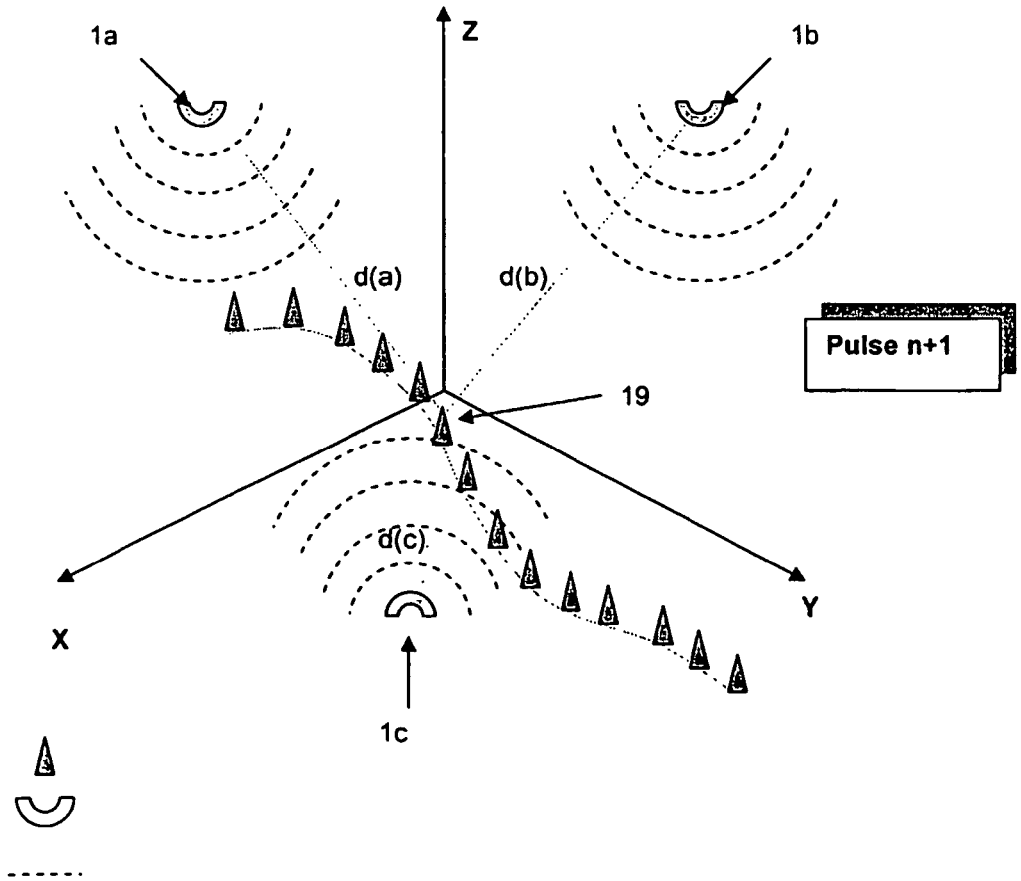

Synchronised signals are emitted by the emitter 1 in the form of pulsing-time-coded-signals (PTCSs). The signals detected by the detectors 3 are transmitted via the data bus 5 to a receiver 11 in the processing unit 7. The processing unit 7 generates an output signal 13, which is sent to a load control system (not shown). Schematics of the pairs of devices of the first embodiment of the invention in use are shown in FIGS. 2a and 2b. The detectors 3 are attached, at spaced apart positions, to an aircraft component (not shown) on which loads are to be measured. The emitters 1 are attached to an area (not shown) which in use deforms to a lesser extent than the component to which the detectors 3 are attached.

Referring to FIGS. 1 and 2a, each emitter 1a, 1b and 1c emits a unique pulsing time-coded signal (PTCS) 17a, 17b and 17c respectively, which are synchronised. The pulsing time-coded signals 17a-17c are shown schematically in FIG. 2a with pulses against time, the pulses of each PTCS representing a unique code. The frequency of the carrier radiation is about 10 Ghz and the carrier radiation is modulated with the pulses of radiation emitted.

In use, a pulse n is emitted at a time t from a first emitter 1a in the form of the PTCS 17a. The pulse n is received at a time t+Δt by a given detector 19 of the detectors 3. Upon receiving the PTCS 17a, the detector 19 then sends a signal via the data bus 5 to the receiver 11 of the processing unit 7. The processing unit is synchronised with the emitter 1a, via the transmitter 15 and is provided with a time interval measuring device (not shown) able to measure time intervals with sufficient accuracy for the application. The processing unit calculates the time difference Δt between the emitter 1a emitting the PTCS 17a and the detector 19 receiving the PTCS 17a. (It will be understood that the resolution of the measurement of the time difference Δt is affected by the accuracy to which the receipt by the detector of the start of the PTCS can be ascertained and not by the frequency of the carrier signal or the duration of the PTCS.) The processing unit then calculates the distance d(a) between the emitter 1a and the detector 19 based upon the measured time difference Δt and the speed of light in air ($c=3\times10^8$ ms$^{-1}$). The pulse n emitted by the omni-directional emitter 1a is also received by all of the other detectors 3, which send signals to the processing unit 7 in a similar manner. Thus, the processing unit ascertains the respective distances between the first emitter 1a and each of the detectors 3.

The pulses n of the other pulsing time-coded signals 17b and 17c are emitted by the other emitters 1b and 1c at substantially the same time as the pulse n of the PTCS 17a is emitted from the first emitter 1a, the pulses n from all emitters being synchronised. The PTCS from each emitter is encoded in a unique manner to enable the pulses from one emitter to be distinguished from any other. Thus, the processing unit receives, in respect of the given detector 19, a signal sent by the detector as a result of the PTCS 17a received from the first emitter 1a, and also signals sent by the detector 19 as a result of receiving the PTCSs 17b and 17c from the other two emitters 1b and 1c. Thus, in relation to the given detector, the processing unit also calculates the distances d(b) and d(c) between the detector 19 and the other emitters 1b and 1c, respectively. The pulses n emitted by the emitters 1b and 1c are also received by all of the other detectors 3, which send the appropriate signals to the processing unit 7. Thus, the processing unit ascertains the respective distances between each emitter 1a-1c and each of the detectors 3 after the pulse n is emitted, and before the next pulse is emitted. This data is stored in electronic form in the processing unit 7.

FIG. 2b, shows the emitters and detectors of FIG. 2a a short time later when another pulse n+1 of the pulsing time-coded signal (PTCS) 17 has been emitted from the emitters 1. The component (not shown) to which the detectors are attached has deformed under the load to be measured.

Referring to FIGS. 1 and 2b, the elapsed time between the pulse n+1 of each PTCS (see FIG. 2a) being emitted from the emitters 1 and the pulse n+1 of each PTCS being received by the detectors is measured using the steps described in relation to FIG. 2a and pulse n. This allows the processing unit to calculate, just after the pulse n+1 is emitted, the respective distances between each emitter 1a-1c and each of the detectors 3 in their new configuration, as shown in FIG. 2b, on the deformed component. This data is also stored in electronic form in the processing unit 7.

The processing unit 7 assumes that the positions of the emitters 1a to 1c remain unchanged between pulses n and n+1 and, using triangulation methods, ascertains the relative positions of all detectors 3 from the data concerning the distances between each emitter 1 and each of the detectors 3.

The processing unit is also arranged to measure the change in relative position of all the emitters 1 and detectors 3 between the pulses n and n+1 emitted by the emitters 1. To achieve this, the processing unit in the first embodiment is arranged to subtract the position of each emitter 1 and detector 3 at pulse n from the position of each emitter and detector at pulse n+1. The processing unit is therefore arranged to provide an indication of the deformation of the component in real-time. It shall be clear that the term 'real-time' actually refers to a collection of 'snap-shots' taken every time a pulse is emitted from the emitters 1. The processing unit can make a comparison between one 'snap-shot' and a default position (for example a rest position) stored in the memory.

The processing unit 7 contains load model data. In the embodiment shown, the load model data are stored in electronic form and comprise data ascertained in advance by making calibration measurements in relation to the component. The load model data comprise deformation data and load data. The processing unit 7 correlates, with the use of such data, the measured deformation of the component to a load and produces the output signal 13. The output signal 13 includes information concerning measurements of the loads sustained by the aircraft component. The output signal is then converted into a three-dimensional visual representation of the aircraft component, or a section thereof, colour coded according to the stress at each point or region in the component. The representation is thus in the form of a stress distribution.

During testing of an aircraft including the aircraft component, the stress distribution on and in the component over time is monitored and the results of the monitoring are used to improve the design of the component. For example, the component may be made stronger in certain parts and less strong in other parts according to the maximum stresses to be sustained by the component during normal use, as assessed by means of the monitoring.

Figure 3:
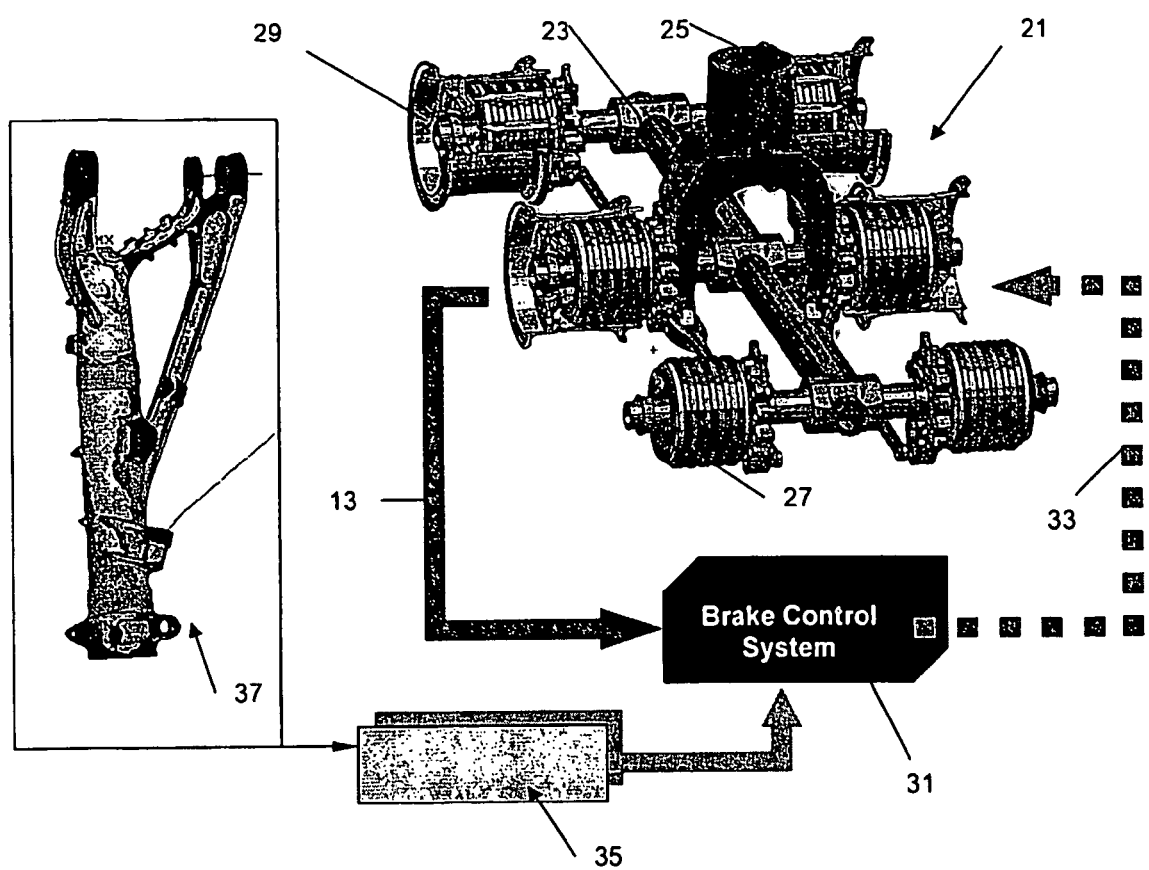
FIG. 3 shows a partially cut-away view of a landing gear and a schematic of a load control system on an aircraft according to a second embodiment of the invention.

In a second embodiment of the invention, shown in FIG. 3, the aircraft further includes a load control system. As shown in FIG. 3, the aircraft includes the landing gear assembly 21, comprising the wheel bogie assembly 23, the landing gear leg 25, the brake discs 27 and wheel hubs 29.

An apparatus for measuring load, for example the apparatus described in the first embodiment, is arranged to measure the load on the landing gear leg 25. Fifteen detectors (not shown) are located at spaced apart positions on the landing gear leg 25, in three parallel and spaced-apart columns positioned on one side of the leg, each column being defined by five detectors. Three emitters are provided on the underside of the aircraft fuselage (not shown). The detectors in this embodiment are in the form of low-profile microstrip antennae and the emitters are omni-directional emitters. The apparatus includes a processing unit (not shown) that functions in the same manner as described above with reference to the first embodiment. Thus, the processing unit ascertains the relative deformation of the leg 25 by means of monitoring the relative movement of the detectors on the leg. From the information concerning the deformation of the leg and a load model that models the behaviour under loading of the leg, the processing unit ascertains information concerning the loading on the leg. In this particular embodiment, the load measurements include indications concerning the torsional, longitudinal and side loads on the leg and also the load resulting from the bending moment at the upper end of the leg caused during braking.

In use, for example during braking after touch-down, the landing gear is subjected to significant forces. The landing gear leg 25 in particular may be subjected to these considerable forces. The processing unit, of the apparatus for measuring the loads, produces an output signal 13, the output signal including a measurement of the bending load sustained by the landing gear leg 25. The output signal 13 is fed into the brake control system 31. The brake control system contains a preset threshold value that corresponds to the maximum load the landing gear leg 25 can safely withstand. If the output signal 13 indicates the load on the landing gear leg exceeds this maximum threshold value, the brake control system sends a signal 33 to reduce the braking force accordingly. The benefits of such a control system are threefold: the loads can be better controlled allowing the strength and weight of the landing gear to be reduced, the braking phase can be made more efficient, and the fatigue loadings on the landing gear can be reduced.

The apparatus of the second embodiment also makes use of a finite element model 35 of part of the landing gear assembly 21. The finite element model 35 includes a virtual model 37 of part of the landing gear 21. Data from the finite element model 35 are used by the brake control system 31. In combination with the output signal 13 from the processing unit, the finite element model 35 allows points on the structure to be given an associated stress. Furthermore the brake control system 31 uses interpolation of the stress data to predict the stress distribution in part of the landing gear assembly 21.

The brake control system contains a preset maximum stress value that the landing gear can safely withstand at a given region. If the indicated stress at such a given region on the landing gear exceeds this value, the brake control system sends a signal 33 to alter the braking force accordingly.

Figure 4:
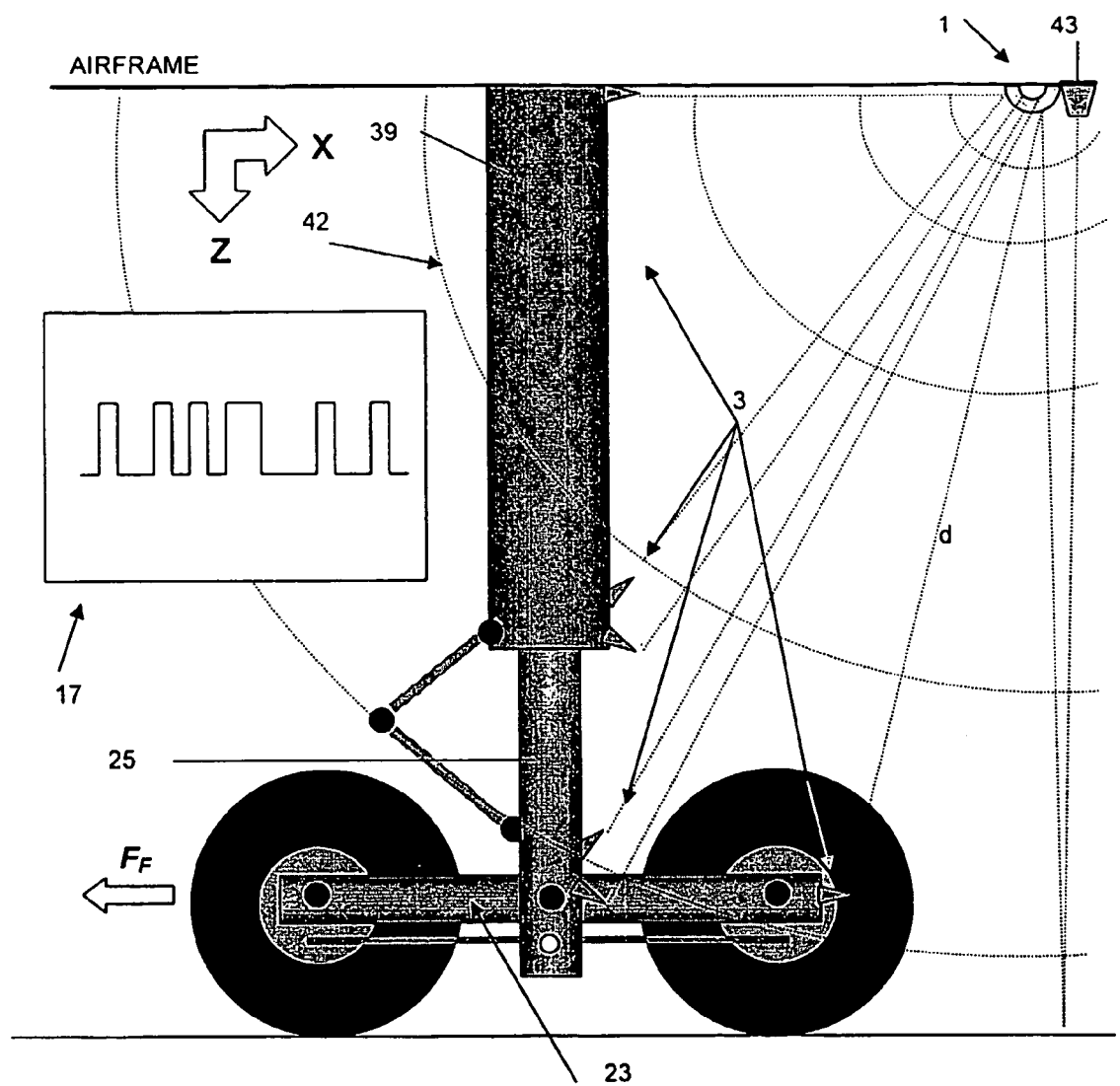
FIG. 4 shows a leg of a landing gear on an aircraft according to a third embodiment of the invention.

FIG. 4 shows part of a landing gear assembly on an aircraft according to a third embodiment of the invention. Six detectors 3 are located on the outer cylinder 39 of the leg 25 and bogie 23 of the landing gear assembly 42. A single emitter 1 is attached to the airframe of the aircraft and emits a signal received by each detector 3. There are therefore six pairs of devices. The airframe in the region of the emitter 1 displaces relatively little relative to the region of the airframe to which the landing gear assembly attaches. Furthermore, a radio altimeter antenna receiver 43 is attached to the underside of the airframe next to the emitter 1.

In use, a PTCS 17 is emitted by the emitter 1. After each pulse, the processing unit (not shown) calculates the distance d between the emitter 1 and each detector 3. The radio altimeter antenna receiver 43 is arranged to measure the location of the altimeter relative to ground level. Use of such equipment as an altimeter is well known in the art. The altimeter is arranged to measure the position of the emitter 1 relative to the ground and also provides an indication of the compression of the landing gear 42.

The apparatus of the third embodiment is used to ascertain and monitor the deformation of the landing gear 42. The information concerning the separations between the single emitter and the various detectors would not provide any useful information regarding the deformation of the leg, without knowing the original position of each detector on the leg and the manner in which the leg is able to deform. Thus, the leg is modelled with the use of a finite element model and information provided regarding the original positions of the detectors on the leg. By using information regarding the original positions of, and separations of, the detectors and the emitter, and by using finite element analysis, the deformation of the leg and therefore the loading on the leg can be calculated. The calculation may be considered as involving the correlation of the separations as measured, with separations corresponding to certain loads and deformations in accordance with an appropriate load model. The calculation of the loads also takes into account the value of the vertical load, when the aircraft is on the ground, as calculated by means of determining the extension, and therefore the loading, of the hydraulic parts of the landing gear in the vertical direction from the measured separation of the altimeter receiver 43 from the ground. The processing unit is therefore able to provide a detailed and accurate measurement of the loads acting on the leg during landing. A similar system is provided on each landing gear leg and the loads are therefore provided on a per leg basis.

Figure 5:
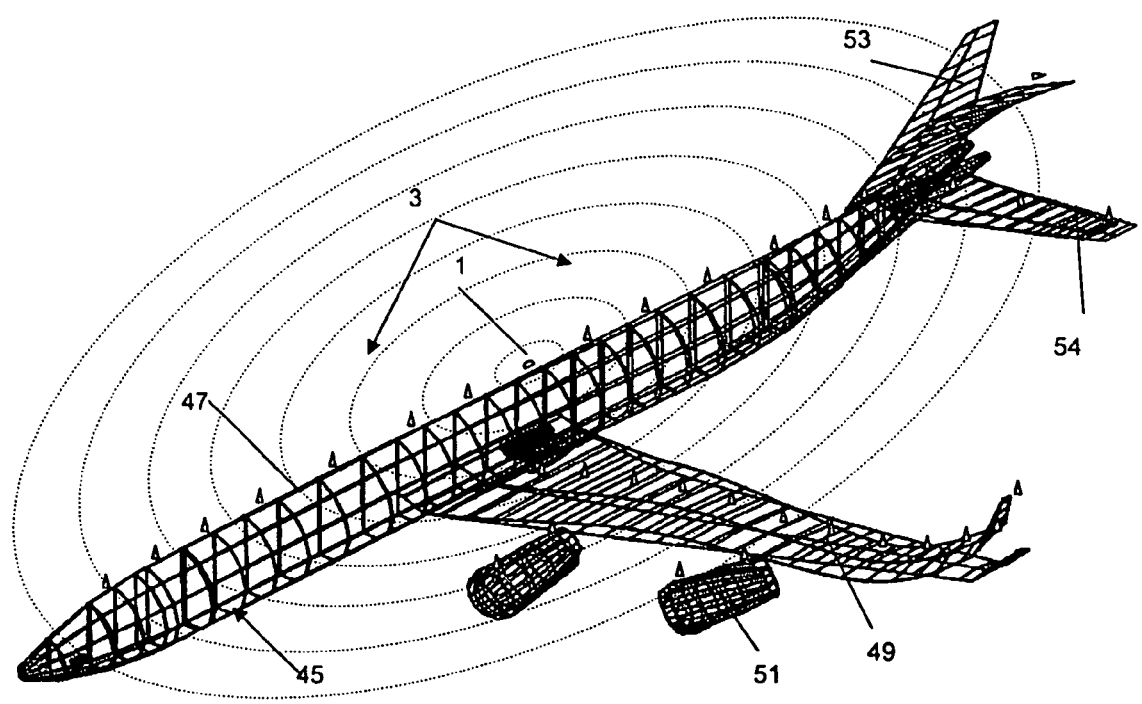
FIG. 5 shows a skeletal perspective view of half of an aircraft according to a fourth embodiment of the invention.

FIG. 5 shows two skeletal views of one half of an aircraft 45 according to a fourth embodiment of the invention, the darker, more prominent lines showing the aircraft in a deformed state and the lighter, less prominent lines showing the aircraft in an undeformed state. The deformation of the aircraft structure has been exaggerated for the sake of clarity. A multiplicity of detectors are positioned over the length and breadth of the aircraft structure, including along the centreline of the fuselage 47, across the wing 49, on the nacelle 51, across the vertical tail plane 53 and across the horizontal tail plane 54. Three emitters 1 are positioned close to the centre of gravity of the aircraft (only one emitter 1 being shown in FIG. 5 for the sake of clarity). The position of all the detectors 3, at the time of emission of each pulse by the emitter 1, is ascertained in the fashion described in relation to the third embodiment. Thus the shape and deformation of the aircraft, or parts thereof, may be ascertained and, over time, monitored.

In the fourth embodiment, the processing unit (not shown) includes a deformation control system. An actuation system (not shown) is located within the wing structure in the tip region of the wing 49. The deformation control system is arranged to send a signal to the actuation system in dependence on the measured deformations. If the measured deformation of the wing 49 exceeds a threshold value (as illustrated schematically in FIG. 5 by means of the darker more prominent lines showing the aircraft in a deformed state) a predetermined number of times over a set time period, the deformation control system sends a signal to the actuation system. This may occur for example during flutter, gusts or manoeuvres. Upon receiving the signal from the deformation control system the actuation device modifies the geometry of the wing skin, causing for example the centre of lift to move, with the aim of damping flutter of the wing.

It will be appreciated that various modifications may be made to the above-described embodiments of the invention without departing from the spirit of the invention.

In the first embodiment, signals are converted into values representative of relative separations of devices in each pair and then, as a separate subsequent step, further converted into measurements of the load. Of course, such calculations and/or signal processing could be conducted as a single step, for example by a single computer processor. In such a case, calibration of the measuring system might be performed by relating the signals received from the antennae to a known load applied to a test rig comprising an identical landing gear to that of the aircraft on which the system is to be used.

In the first embodiment, the processing unit need not assume that the emitters remain stationary relative to each other and the processing unit may use best fit methods and/or finite element analysis methods to ascertain the relative movement of each of the emitters.

Whilst in the first embodiment an omni-directional emitter is used and in the second embodiment low-profile micro-strip antennae detectors are used, other forms of microwave antenna could be used including, for example, dish antennae, directional antennae, patch antennae, spiral antennae, dipoles, blade antennae, helix antennae, log periodic antenna arrays, panel antennae, Yagi-Uda arrays, Yagi antennae and/or whip (flexible rod) antennae. It will be appreciated that not all the antennae need to have the same shape and that the shape of a given antennae may be different from that as shown in the Figures, which are in any case merely schematic.

In the second embodiment, the control of the braking force applied is controlled by means of a feedback loop, wherein when the measured load exceeds a pre-set threshold, the braking force is reduced. The amount by which the braking force is reduced could be a pre-set amount, or could be related to the amount by which the measured load exceeds the threshold. Other criteria could be used to assess how and when to reduce the braking force. For example, the braking force could be reduced as quickly as possible (possibly to zero) for a pre-set time, after which the braking force is reapplied.

In relation to the second embodiment the data concerning the finite element model may be located in the processing unit, or the brake control system. Alternatively or additionally, the brake control system may be included in the processing unit.

The data on the position of the emitters and detectors for each pulse need not necessarily be stored in electronic format in the processing unit. For example, the data may be stored in a unit separate from, but accessible by, the processing unit. Alternatively or additionally, the data may be stored in solid-state memories or magnetic format.

Whilst the brake control system of the second embodiment of the invention interpolates the stress data to predict the stress distribution, it shall be understood that this process could be carried out in the processing unit, or any other unit. Furthermore, the stress and/or load distribution may be calculated by interpolation of the load data in output signal.

It shall be understood that the deformation control system need not necessarily be arranged only to detect and correct flutter. The deformation system may, for example, be used to detect and control the movement of other moving parts of the aircraft. Also, when detecting wing deflection, the deformation control system may be arranged to send a signal to the actuation device if the measured deformation exceeds the deformation threshold only once. The deformation system could also include the real time monitoring of the global deformation of the whole aircraft structure (normal modes) and the analysis of the related frequencies, for example normal mode analysis. Such measurements can be made when the aircraft is stationary on the ground (for example during a ground vibration test), when the aircraft is manoeuvring on the ground, as well as when the aircraft is airborne. The system could also be used to monitor in real time the position of the control surfaces and their effects on the wing structure (including monitoring bending, torsional movements and loads and the like) and on the rest of the aircraft. It shall also be understood that the system may monitor the position of other aircraft components, for example, a landing gear assembly. As such the system may provide a real time indication of the position of the landing gear assembly during, for example, deployment of said assembly.

The apparatus of the present invention could alternatively be used to monitor the loading and movement of other load bearing structures in other applications relating to for example aerospace, civil engineering, automotive, or naval applications. The emitter(s) and detector(s) would of course need to be modified to be suitable for such applications so that appropriate ranges of measurement at appropriate resolutions could be made. Such modifications would mainly consist simply of scaling the size of the components up or down as appropriate and would require only routine work to be conducted by the notional person skilled in the art.

Where, in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not delimit the scope of the independent claims.

The invention claimed is:

1. An aircraft including an apparatus for measuring an operational load on an aircraft component, the apparatus including a processing unit and a plurality of pairs of electromagnetic radiation devices, wherein
   each electromagnetic radiation device comprises an emitter paired to at least one detector, the emitter being an emitter of electromagnetic radiation, and the detector being able to detect radiation from the emitter, wherein either the emitter or the detector is mounted to the aircraft component and the paired electromagnetic radiation device mounted independently to the aircraft,
   the separation of the emitter and the detector is altered upon application of the operational load, the emitter and the detector each include a signal generating component, and
   wherein the processing unit receives a signal from the signal generating component of the emitter and the detector from which an indication of a deformation of the aircraft component may be ascertained and provides an output signal which provides an indication of the load sustained by the aircraft component, the output signal being ascertained by the processing unit by means of a calculation involving the signals received by the processing unit and load model data.

2. An aircraft according to claim 1, wherein a multiplicity of electromagnetic devices of one type (i.e. emitter or detector) are fixed at respective spaced apart positions local to the aircraft component and at least one electromagnetic device of the other type is (i.e. emitter or detector) fixed at a position remote from the aircraft component.

3. An aircraft according to claim 1, wherein the processing unit calculates the separation of an emitter and a detector by measuring the elapsed time between an emitter emitting a pulse of electromagnetic radiation and the pulse of electromagnetic radiation being received by a detector.

4. An aircraft according to claim 3, wherein the pulse of electromagnetic radiation is a time-coded pulse of electromagnetic radiation.

5. An aircraft according to claim 1, wherein the output signal provided by the processing unit includes indications concerning a stress distribution within part of the aircraft component.

6. An aircraft according to claim 1, wherein the or each emitter of the plurality of pairs of devices is arranged to emits microwave radiation.

7. An aircraft according to claim 1, wherein the or each emitter of the plurality of pairs of devices is an omni-directional emitter.

8. An aircraft according to claim 1, wherein the aircraft component is a leg of an aircraft landing gear.

9. An aircraft according to claim 1, further including a load control system, wherein the load control system is arranged to monitors a measurement of the loads sustained by the aircraft component, the measurement being ascertained from the output signal from the processing unit, and to control a part of the aircraft in dependence on the measurements so monitored.

10. An aircraft according to claim 9, wherein the load control system is a braking control system, and the aircraft component is a leg of an aircraft landing gear, wherein, in use, the braking control system is arranged to controls the braking in dependence on the loads monitored by the braking control system.

11. An apparatus for measuring an operational load on an aircraft component, the apparatus including a plurality of pairs of electromagnetic devices, wherein
   each pair of electromagnetic devices comprises an emitter and a detector, the emitter being an emitter of electromagnetic radiation, and the detector being able to detect radiation from the emitter, wherein either the emitter or the detector is mounted to the aircraft component and the paired electromagnetic radiation device mounted independently to the aircraft,
   the apparatus being arranged to be suitable for use on an aircraft so that, and wherein, in use, when the aircraft component is subjected to the operational load of the type to be measured, the physical separation of the emitter and the detector of at least one pair of devices is altered, the pairs of devices in use generating signals from which an indication of a deformation of the aircraft component may be ascertained.

12. An apparatus according to claim 11, further including a processing unit, wherein, in use, the processing unit is arranged to receives signals from which an indication of the deformation of the aircraft component may be ascertained and provides an output signal which provides an indication of the load sustained by the aircraft component, the output signal having been ascertained by the processing unit by means of a calculation involving the signals received by the processing unit and load model data.

13. A method of measuring an operational load on an aircraft component, the method including the following steps:
   (i) mounting at least one emitter and a corresponding at least one detector to the aircraft, such that the at least one emitter and the at least one detector form a pair and such that either the at least one emitter or the at least one detector is mounted to the aircraft component and the paired electromagnetic radiation device is mounted independently to the aircraft,
   (ii) causing electromagnetic radiation to be emitted from the at least one emitter,
   (iii) collecting data dependent on the change in separation between the at least one emitter and the corresponding at least one detector, the change in separation being caused by an operational load sustained by the aircraft component,
   (iv) repeating steps (ii) and (iii) in respect of additional independently mounted different emitter emitters and/or detector detectors, and
   (v) providing an indication of the operational load sustained by the aircraft component from the data collected in step (iii) and from load model data.

14. A method according to claim 13, wherein step (v) includes performing a calculation in which an indication of the deformation of the aircraft component is ascertained by triangulation.

15. A method according to claim 13, when performed as part of a method of controlling the loads sustained by an aircraft component including monitoring the operational loads on an aircraft, the method further including a step of controlling a part of the aircraft in dependence on the results of the monitoring of the operational loads.

16. A method according to claim 15, when performed as part of a method of manoeuvring an aircraft on the ground, the method further including a step of controlling the operational loads sustained by the aircraft during the manoeuvres by means of monitoring the operational loads on the leg of the landing gear of the aircraft and controlling the braking and/or steering of the aircraft in dependence on the operational loads monitored.

* * * * *